United States Patent [19]

Laskowski et al.

[11] Patent Number: 5,796,620
[45] Date of Patent: Aug. 18, 1998

[54] COMPUTERIZED SYSTEM FOR LOST FOAM CASTING PROCESS USING RAPID TOOLING SET-UP

[75] Inventors: John S. Laskowski, Auburn; Adam Pintz, Strongsville, both of Ohio

[73] Assignee: Cleveland Advanced Manufacturing Program, Cleveland, Ohio

[21] Appl. No.: 383,203

[22] Filed: Feb. 3, 1995

[51] Int. Cl.$^6$ .................................................. G06F 19/00
[52] U.S. Cl. ........................... 364/475.02; 364/468.04; 364/468.25; 364/475.09
[58] Field of Search ................. 364/469.02, 474.24, 364/468.01, 468.03, 468.04, 468.24, 468.25, 475.02, 475.03, 475.09; 264/401, 326

[56] References Cited

U.S. PATENT DOCUMENTS

| | | |
|---|---|---|
| 657,807 | 9/1900 | Baeck. |
| 1,504,822 | 8/1924 | Hess. |
| 2,043,503 | 6/1936 | Aschenborn. |
| 2,100,148 | 11/1937 | Parker .................................. 40/28 |
| 2,216,533 | 10/1940 | Haplan .................................. 33/3 |
| 2,410,888 | 11/1946 | Lucy .................................. 25/118 |
| 3,081,129 | 3/1963 | Ridder .................................. 297/452 |
| 3,565,387 | 2/1971 | Neustadter et al. ............... 249/453 |
| 3,596,869 | 8/1971 | Humphrey .......................... 249/155 |
| 4,536,980 | 8/1985 | Fleming .............................. 40/427 |
| 4,654,989 | 4/1987 | Fleming .............................. 40/427 |
| 4,792,112 | 12/1988 | Corby et al. ....................... 249/155 |
| 4,890,235 | 12/1989 | Reger et al. ....................... 364/468 |
| 4,932,852 | 6/1990 | Suzuki ................................ 425/2 |
| 4,972,351 | 11/1990 | Reger et al. ....................... 364/468 |
| 5,022,838 | 6/1991 | Payne ................................ 425/145 |
| 5,023,800 | 6/1991 | Cawer et al. ................... 364/474.24 |
| 5,134,569 | 7/1992 | Masters ............................. 364/474 |
| 5,151,277 | 9/1992 | Bernardon et al. .............. 425/112 |
| 5,184,306 | 2/1993 | Erdman et al. ................... 364/474 |
| 5,192,469 | 3/1993 | Smalley et al. ................... 264/401 |
| 5,192,560 | 3/1993 | Umetsu et al. ................... 425/175 |
| 5,281,117 | 1/1994 | Hong .................................. 425/2 |
| 5,513,972 | 5/1996 | Schroeder et al. .............. 425/175 |

Primary Examiner—Paul P. Gordon
Attorney, Agent, or Firm—Vickers, Daniels & Young

[57] ABSTRACT

A casting system is disclosed which utilizes conventional CAD/CAM software to automatically position the rods of a pin mold to replicate, by the rod end surfaces, the surface contours of an object drawn on a CAD machine when the object is cast in the pin mold. The system modifies the data base to account for the plastic liner and liner variations to permit production of styrofoam cores in the Lost Foam Casting process while the pin mold incorporates a rod and hole configuration in the guide plates which permits automatic positioning and frictional locking of the rods in the pin mold.

22 Claims, 9 Drawing Sheets

FIG. 1
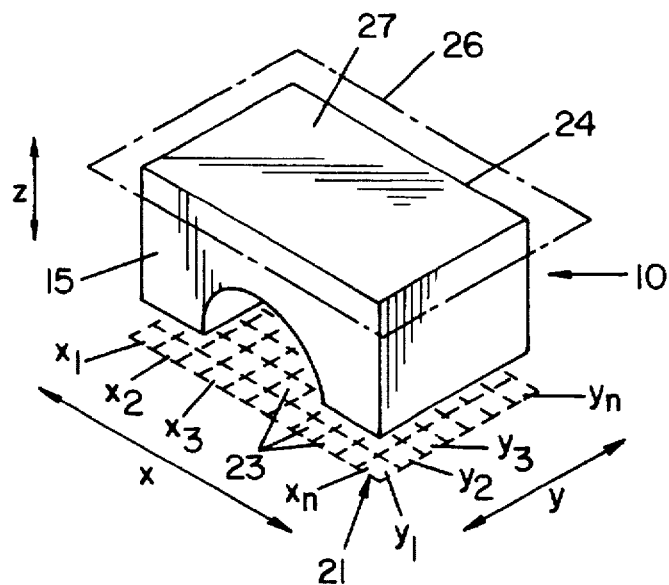
FIG. 2A
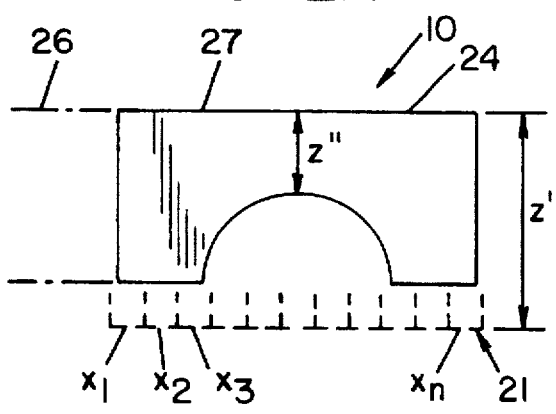
FIG. 2B
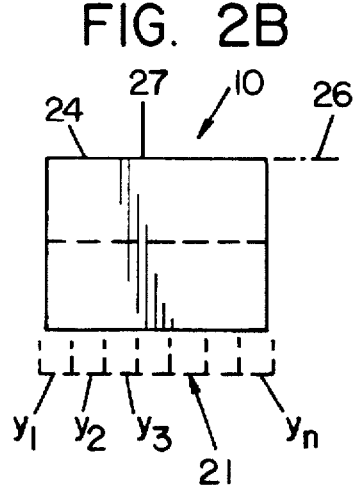
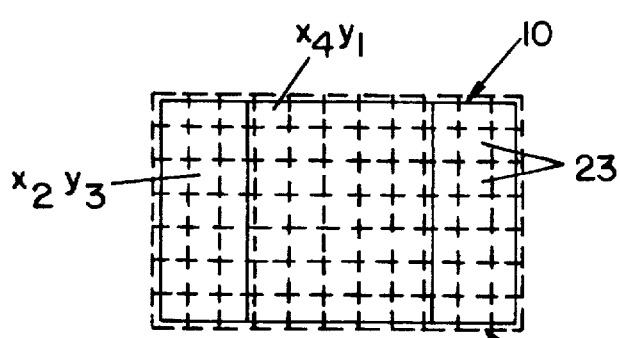
FIG. 2C

COMPUTERIZED SYSTEM FOR LOST FOAM CASTING PROCESS USING RAPID TOOLING SET-UP This invention relates to casting systems in general and more particularly to a casting process in which the mold is formed by movable rods, the end surfaces of which form the part contour.

The invention is particularly applicable to and will be described with specific reference to the Lost Foam or "lost wax" casting process where it has particular application and benefits. However, those skilled in the art will recognize that the invention can be applied to other conventional metal casting processes.

INCORPORATION BY REFERENCE

The following material is incorporated by reference, including by extension, the material cited in the references, so that details and techniques known to those skilled in the art need not be repeated herein and the description of the invention need not set forth in that detail what is already known to those skilled in the art. The material incorporated by reference herein, while relevant to the present invention does not constitute or form the invention, per se.

1) Bernardon et al U.S. Pat. No. 5,151,277, dated Sep. 29, 1992 and titled "Reconfigurable Fiber-Forming Resin Transfer System".

2) Umetsu et al U.S. Pat. No. 5,192,560, dated Mar. 9, 1993 and titled "Variable Mold Apparatus".

3) Humphrey U.S. Pat. No. 3,596,869, dated Aug. 3, 1971 and titled "Mold Forming Device".

4) Masters U.S. Pat. No. 5,134,569, dated Jul. 28, 1992 and titled "System and Method for Computer Automated Manufacturing Using Fluent Material", and additionally the references cited therein.

5) Erdman et al U.S. Pat. No. 5,184,306, dated Feb. 2, 1993 and titled "Automated High-Precision Fabrication of Objects of Complex and Unique Geometry" and additionally, the references cited therein.

6) Payne U.S. Pat. No. 5,022,838, dated Jun. 11, 1991 and titled "Multi-Axis Rotational Distributing Apparatus".

7) Hong U.S. Pat. No. 5,281,117, dated Jan. 25, 1994 and titled "Molding Mechanism".

8) Reger et al U.S. Pat. No. 4,890,235, dated Dec. 26, 1989 and titled "Computer Aided Prescription of Specialized Seats for Wheelchairs or Other Body Supports".

BACKGROUND

A) Lost Foam Casting Process

The invention is particularly suited for use in constructing molds for the "Lost Foam Casting" process which process was developed in the 1950's and can be viewed as being similar to the "Lost Wax" process with plastic (styrofoam) substituted for wax. In the Lost Foam Casting process, a mold is prepared and a plastic liner is applied to the mold in a molding press to create a foam representation of the cast part. After forming, the pattern is coated with a refractory coating to maintain its integrity during sand pack and casting operations. The pattern is then packed in unbonded sand and molten metal is poured into the pattern. The pattern melts, vaporizes and is ultimately replaced by the molten metal. The result is a near net shape casting which replicates the original foam pattern. The quantifiable advantages of the Lost Foam Casting process are:

i) High dimensional accuracy;

ii) Reduced machining requirements due to the dimensional accuracy of castings, reduced draft angles, and reduced machining stock allowances;

iii) Higher yield ratio (ratio of metal poured to casting weight) than other processes due to reduced gating requirements; and iv) Casting more complex internal and external shapes that would normally require extensive coring and/or machining.

Despite its advantages over conventional casting processes, the Lost Foam Casting process has enjoyed commercialization only in captive foundries producing high volume castings, i.e., automobile manufacturers. Small to medium sized foundries casting small (0 to 500) to medium (501 to 5-10,000) sized production runs, have not been able to effectively use the Lost Foam Casting process, principally because the foundries cannot amortize expensive die/mold tooling for short production runs.

At the time of the invention, the Lost Foam Casting process was commercially practiced to produce a foam pattern by first preparing a mold drawing from the part drawing. The mold drawing accounts for parting lines, pullbacks, foam sections, gating, risering and shrinkage due to pattern and metal solidification. From the mold drawing tool sections were rough machined out of Aluminum 6061T6 forged billets to within a 2 mm tolerance. Rough machining includes contouring the back of each cavity to allow a uniform thickness of the tool wall. The tool sections were then heated to stabilize their dimensions. The process was incrementally repeated until mold dimensions, within 0.05 mm tolerance, were obtained. Holes for the vents and fill guns were also drilled.

Finally, the tool cavities and inserts were manually finished and polished for the best performance. After the tool has been verified it was then fastened to the platen in the steam chest. The steam chest was placed into the molding press and foam pattern production initiated. The above description serves as an overview of the tooling set-up stage and illustrates the reasons for high tooling costs and long lead times typically associated with the Lost Foam Casting process until the present invention.

B) Mold forming techniques.

It has long been known to construct a casting mold by the use of a plurality of pins, rods, needles or the like, the ends of which are intended to replicate the surface of the desired casting when each pin is longitudinally positioned to a precise position in a frame. See, for example, U.S. Pat. Nos. to Baeck 657,807 (1900); Hess 1,504,822 (1924); Aschenborn 2,043,503 (1936); and Lucy 2,410,888 (1946). The art is typified by U.S. Pat. No. to Humphrey 3,596,869 (1971), which illustrates a mechanism for clamping rods simultaneously in place after the rods have been extended to their desired position which is typically accomplished by contacting the surface of a part with the rod ends to replicate the surface contour.

C) Improved pin forming techniques.

Computer control techniques developed in the machine control industry have also been used to manufacture custom articles by controlling a plurality of pin positions the end surfaces of which cumulatively form the contour of a part. See, for example, U.S. Pat. Nos. to Reger 4,890,235 (1989) and Payne 5,022,838 (1991) in which the finished part is traced to develop data, digital or analog, which is then used to adjust pin position in a die/mold for duplicating the part.

In particular, specially developed controllers have been recently programmed to move servo-actuators to an x-y grid position for engaging a rod and then moving the rod a predetermined position. The controller then sequences to the next rod which is also automatically positioned to eventually form a die or mold for sheet goods such as plastic sheets or the like. See. for example. U.S. Pat. Nos. to Bernardon 5,151,277 (1992) and Umetsu 5,192,560 (1993) in which, presumably, specially developed co-ordinates are inputed to the controller through a computer. These developments represent an advance in the die/press art for high volume production runs.

D) CAD/CAM techniques.

In U.S. Pat. No. to Masters, 5,134,569, a direct cad manufacturing (DCM) process is discussed in which a three dimensional object is drawn on a computer screen using a CAD program and the coordinates of the three dimensional design are stored in a data base. The object is then constructed using the coordinates and Masters defines such techniques as a particle buildup, photochemical machining, laminated object techniques, selective laser sintering, stereolithography, and extrusion. In Masters, a fluent material is extruded in a path controlled by the CAD data base to produce an object.

In U.S. Pat. No. to Erdman et al, 5,184,306, a CAD/CAM data base is used to modify the coordinates obtained from a scanned object to machine a final form, such as a tooth, which has been modified by various data base "forms" in accordance with known dental techniques to produce a tooth which fits better within the patient's mouth.

Masters and Erdman show the ability of data bases generated by conventional CAD/CAM software to manufacture products. This invention may be viewed as a further extension thereof.

SUMMARY OF THE INVENTION

It is thus a principal object of the invention to utilize a conventional CAD/CAM data base which is modified to automatically produce an accurate rod configured mold thus obviating mold production by conventional machining to economically produce intricate castings of any object.

This object along with other features of the invention is achieved in a process for molding an object which includes the steps of drawing the object using a computer machine employing conventional CAD/CAM software to develop a data base file of the surface contour of the object and establishing a parting line plane on the drawing which contains the parting line of the object when cast in the mold. The process includes modifying the data base file by first dividing the surface contour into pixels of discrete area and assigning to each pixel an x-y coordinate defining the position of each pixel in an x-y plane and then determining by computer calculation, the distance of each pixel from the parting line plane which distance is assigned to the pixel x-y coordinate. A mold frame is provided having a plate extending in an x-y plane with the plate having a plurality of openings extending therethrough and within each opening, a rod longitudinally movable relative to the holes is provided, with each rod having an end surface of area corresponding to the pixel area. Significantly, the modified data base is utilized by a computer controlled machine to index the frame to a computer selected x-y position corresponding to any computer selected pixel and longitudinally moving the rod at each selected position to a distance corresponding to the selected pixel distance extending to the parting line plane whereby the end surfaces of the rods replicate the surface of the object without the necessity of machining the mold by utilizing any CAD/CAM drawing of any object. Significantly, the distance from the parting line plane to the pixel is automatically adjusted or compensated to account for mold liner thickness or mold liner variation as well as other casting techniques related to wall thickness, undercuts, etc.

In accordance with a more general feature of the invention an automatic process for manufacturing a three dimensional mold of an object for use in any casting process is provided with the object designed and drawn on a computer machine which includes the steps of providing from the drawing of the object developed by the computing machine a designed data file of surface coordinates defined as x-y coordinates and a series of two dimensional orthogonal planes extending in an x-y direction, each x-y coordinate indicative of a discrete pixel extending over a discrete surface area of the object and an x-y plane with each x-y plane spaced a discrete distance from one another. The process establishes a parting line for the object which is correlated to a third dimension z, orthogonal to the x-y planes and generated by use of the computer for selecting x-y coordinates to compute a z distance corresponding to the distance from the selected x-y coordinate to the parting line which distance, for each selected x-y coordinate in a given x-y plane, is correlated to the anticipated thickness of a mold liner with the data being used to generate a modified data file in which each x-y coordinate has a generated z distance associated therewith. The process then automatically forms by use of the modified data file a mold using selected x-y pixels with each x-y pixel being modified by the z distance and a plastic liner is applied to the mold to produce a core pattern for subsequent use in the Lost Foam casting process.

In accordance with another aspect of the invention a lost foam casting system which includes a mold for forming a foam core in a molding press is provided which includes a conventional CAD/CAM data file of the object drawn on a computerized machine. Importantly, an arrangement is provided to modify the CAD/CAM data file by i) dividing the surface of the object into discrete areas or pixels, each pixel lying in an orthogonal two dimensional x-y plane, ii) assigning to each pixel a computed distance extending in a z dimension orthogonally from the x-y plane to a parting line plane in which the parting line of the core resides, and iii) modifying the z distance to account for mold liner characteristics. A mold frame having a plurality of rods situated side by side in an x-y plane corresponding to the plane of the pixels is provided with each rod having an end surface corresponding to the pixel and movable in a longitudinal direction. A servo-actuated, computer controlled arrangement accesses the modified data file to longitudinally position each rod so that each rod's end surface corresponds to the surface position of the object spaced from the parting line a computed distance to account for molding variation caused by the mold liner.

In accordance with a still further aspect of the invention a universal mold is provided which includes a frame having a guide plate extending in an x-y plane. The plate has a plurality of first configured openings extending therethrough with each opening elliptical in configuration and defined by a minor and a major diameter. A plurality of rods are provided with each rod having a longitudinally extending stem portion, a top end portion having a top end surface for forming a portion of the mold surface and a bottom end portion for rod gripping and positioning. Each rod stem portion extends through one of the plate's openings and has an oval configuration with a minor diameter smaller than each opening's minor diameter and a major diameter smaller than each opening's major diameter but longer than each opening's minor diameter. A servo-actuated, computer controlled driving mechanism is provided for engaging the bottom end portion of each rod and longitudinally moving each shaft relative to its respective guide plate hole a predetermined distance and thereafter rotating the stem portion relative to its opening to frictionally lock each rod within the guide plate whereby a pin mold mechanism is provided for accurately, quickly and automatically positioning and locking the rods forming the contour of the mold surface. Still further, the frame is positioned in a platen in the molding press with a steam pressure injected mechanism provided above and below the pins to assure that pin position is not disturbed after the rod ends are coated with a plastic liner while the plastic is heated under pressure to form an accurate, foam core configuration.

It is a principal object of the invention to provide an automatic, computerized method and apparatus for forming disposable, styrofoam cores used in sand casting processes.

It is another object of the invention to provide a system and mold to produce patterns and/or cores by a mold which, in turn, is produced from a conventional CAD drawing without the use of machine tools.

Still another general and important object of the invention is to provide a system which utilizes a conventional CAD/CAM data base to automatically produce a pin mold for coating a drawn object.

Still another object of the invention is to provide a system, method and apparatus to automatically produce by computer control styrofoam cores for use in a lost foam or "lost wax" casting process to produce intricately shaped castings to close tolerances.

Yet another object of the invention is to provide a system using rods to form a mold which can be applied to a lost foam or lost wax sand casting process to produce intricate castings to close tolerances in a relatively short time.

Still another specific object of the invention is to provide a system, method and apparatus for producing a mold by means of adjustable rods having ends which form the surface of the mold which, automatically, can be quickly and easily adjusted to their proper dimensional relationship to form a mold surface.

A still further object of the invention is to provide a system for automatically forming a styrofoam core which uses frictional engagement to position rods having ends which form the surface of the mold while permitting application of plastic material to the mold which do not disturb the position of the rods while coating and forming the styrofoam core to permit forming accurate and intricate castings to close tolerances.

Yet another object of the invention is to provide a computer generated and controlled system which produces styrofoam core molds replicating part contours at a cost justifying Lost Foam casting patterns for small (0 to 500) and medium (501 to 5000) piece runs as well as large production runs.

These and other objects, features, and advantages of the invention will become apparent from the following description of species thereof taken together with the accompanying drawings.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein:

FIG. 2A is a representation of a computer drawn front view of the object illustrated in FIG. 1;

FIG. 2B is a representation of a computer drawn side view of the object illustrated in FIG. 1;

FIG. 2C is a representation of a computer drawn bottom view of the object illustrated in FIG. 1;

FIG. 10D-1 is a view similar to FIG. 10D but showing an alternative method of applying the liner;

DETAILED DESCRIPTION OF THE PREFERRED EMBODIMENT

Figure 3:
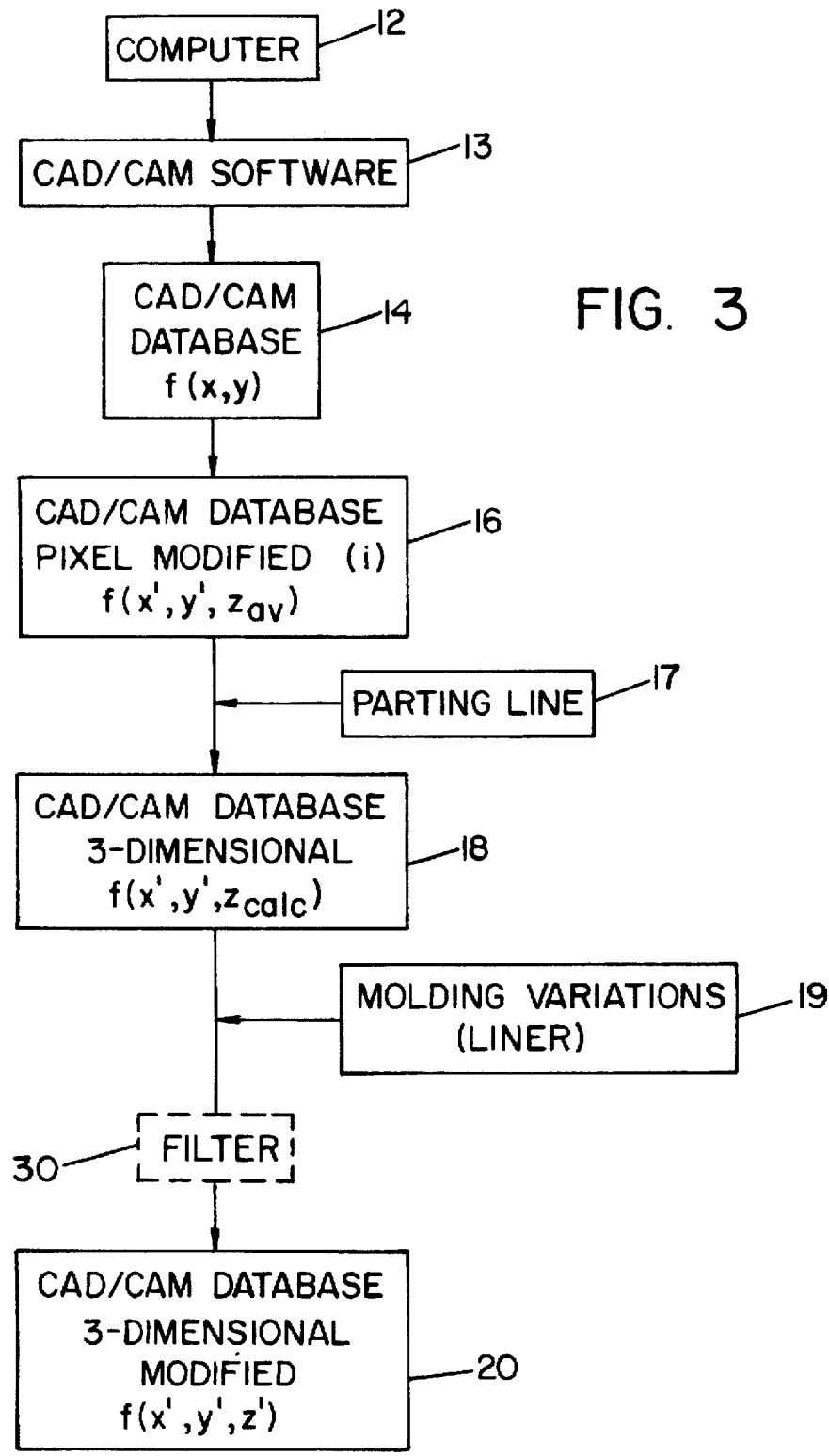
FIG. 3 is a general hardware/process, flow chart illustration of a portion of the system of the invention showing how the data base used in the invention is developed.

Referring now to the drawings wherein the showings are for the purpose of illustrating preferred embodiments of the invention only and not for the purpose of limiting same, there is shown in FIGS. 1, 2A, 2B, and 2C an object 10 which, for illustrative ease and explanation purposes only, is in the form of a journal bearing block.

Figure 10A:
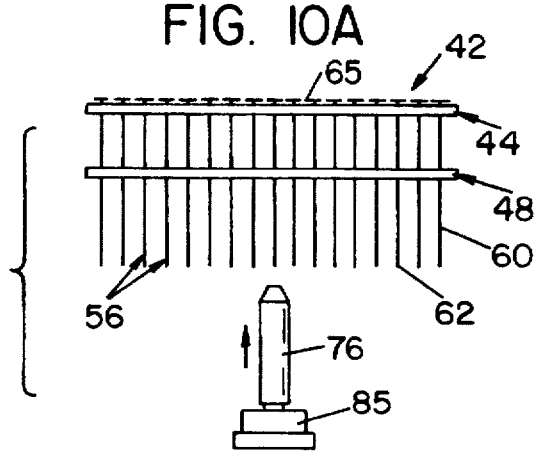
FIG. 10A is a longitudinal schematic view of the molding system of the present invention with the mold rods in an unconfigured or at rest condition while the indexing table is being positioned to engage a rod.
Figure 10B:
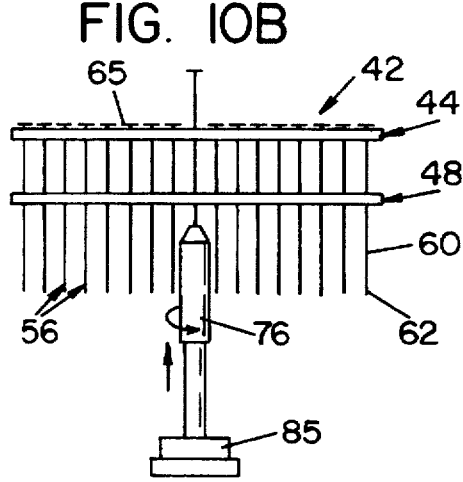
FIG. 10B is a view similar to FIG. 10A but illustrating how the rods are longitudinally positioned and locked to replicate the surface of the part.
Figure 10C:
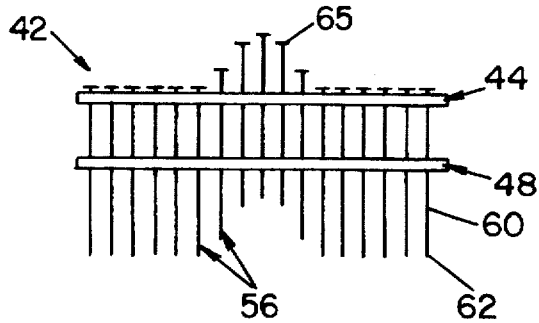
FIG. 10C is a view similar to FIGS. 10A and 10B but showing the rods, positioned and locked into the configuration of the object to be cast.
Figure 10D:
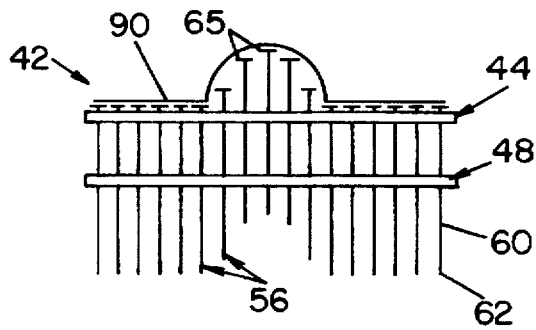
FIG. 10D is a view similar to FIG. 10C but showing a plastic liner applied over the rod end surfaces.
Figures 1, 10D:
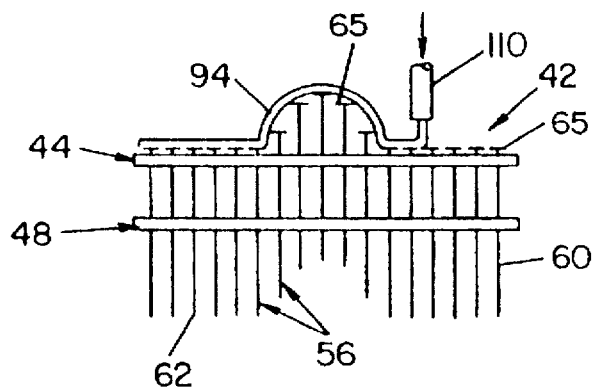
FIG. 1 is a three dimensional view of an object to be produced as a casting drawn on a CAD machine.

Object 10 may be drawn in its perspective view such as shown in FIG. 1 or by a traditional drawing views such as shown in FIGS. 2A, 2B, and 2C by means of a conventional computer aided machine 12 (FIG. 3) such as a conventional CAD machine. Computer machine 12 uses conventional Computer-Aided-Design/Computer-Aided-Manufacturing (CAD/CAM) software 13 (FIG. 3) to generate the drawing of object 10. As is well known, in conventional CAD machine 12, a designer communicates with the computer by way of a data tablet and/or keyboard and instructs the machine to create, scale, rotate, modify and/or label various elements of the design as reflected in the CAD/CAM software 12 which answers by interpreting the instructions to accomplish what it was directed to do, and displays the results on a terminal CRT screen while compiling a data file corresponding to the design produced and displayed. Conventional CAD/CAM data base file 14 is diagrammatically shown in FIG. 3. CAD/CAM data base file 14 contains coordinate information of the three dimensional design of object 10 which may then be stored on a hard disk or other computer storage medium for archival, retrieval, modification, etc. purposes.

The data in conventional CAD/CAM data base file 14 includes a large number of points falling on the exterior surfaces, designated by reference numeral 20 of object 10. Each point is expressed as a three-dimensional coordinate x, y, z. A sufficient number of such coordinates are collected in CAD/CAM data file 14 to permit grouping and digitization of adjacent coordinates to produce pixels of adequate resolution sufficient to be displayed on the raster of a CRT screen and/or printing of a completed drawing. As is well known, rotating the object thus changes the point coordinates in turn changing the bit data of the pixel raster which makes up the three dimensional picture of the object, i.e., FIG. 1.

In accordance with the invention, the conventional CAD/CAM data file 14 is modified by first creating a two dimensional plane 21 which for convenience sake is established as an x-y plane extending along the x-axis and y-axis as shown in FIGS. 1, 2A, 2B, and 2C. The x-axis is then divided into discrete increments designated $x_1, X_2, X_3, ---X_n$ and similarly the y-axis is likewise divided into discrete increments designated $y_1, Y_2, Y_3, ---Y_n$. The x-y plane 21 is thus divided into a grid with each element 23 of the grid having its own address f(x,y). The size of each element 23 in x-y plane 21 corresponds to the end surface area of each rod in the mold of the invention as described hereafter. All of the surface points in conventional CAD/CAM data base 14 are then assigned to the appropriate grid element or pixel 23 of x-y plane 21 and averaged to develop one coordinate or pixel $f(x',y',z_{av})$ designated by schematic block 16 in FIG. 3 for each element or pixel 23 of x-y plane 21. Each pixel 23 thus lies in its own x-y plane which in turn is established by its calculated $Z_{av}$ value. Thus, each pixel 23 will, depending on the surface of the object, lie in its own x-y plane determined by the z average data base calculation.

The machine operator next establishes a parting line that object 10 would have when it is reproduced as a casting. The parting line is established in accordance with conventional foundry practice and for the journal bearing block illustrated in FIGS. 1, 2A, 2B, and 2C the parting line is shown by reference numeral 24 lying in a two-dimensional parting line plane 26. For ease in explanation parting line 24 and parting line plane 26 for the preferred embodiment is chosen to be coincident with end surface 27 of object 10. The step of establishing a parting line plane is indicated schematically by block 17 in FIG. 3.

The CAD/CAM software is now modified by calculating the distance for each grid element or pixel 23 extending on the z-axis to parting line plane 26, which distance is schematically illustrated in FIGS. 1 and 2A as z" and from that distance subtracting a base z distance shown as z' in FIGS. 1, and 2A to generate a $Z_{calc}$ distance which, as explained later, will be the distance that the rod end surfaces extend or protrude from the mold's guide plate. For drawing purposes the reference base z is shown as x-y plane 21. This step is shown schematically by block 18 in FIG. 3 which results in the generation of a data base where each element or pixel 23 has a coordinate $f(x',y',z_{calc})$ associated therewith. In accordance with the broad concept of the invention, the modified data base can now be used to construct a pin mold. That is, the intermediate, modified data base depicted by schematic block 18 can be used to form the pin mold without any additional modification.

However, the invention was conceived for use in the Lost Foam Casting process which requires that a plastic liner be fitted within the mold contour so that the interior surface of the mold liner precisely replicates the surface of object 10 which is to be cast. Accordingly, in accordance with the invention the $Z_{calc}$ coordinate is further modified to increase its position relative to parting line plane 26 to account for the thickness of a plastic liner used to form the core in the Lost Foam Casting process. The "liner thickness" is inputted to intermediate data base 18 as shown by schematic block 19 in FIG. 3 to finally result in an actual z distance z' and a final modified data base f(x',y',z') as shown by schematic block 20. As noted in the Background when hot metal contacts the styrofoam core, the core is vaporized by the melt heat. The metal solidifies at the sand but the liner affects solidification and is conventionally accounted for in the mold dimensions for the styrofoam core.

In accordance with a broad aspect of the invention, the liner thickness can be assumed constant and in fact is a sheet positioned within the pin mold. That liner is melted and fused into the contours of the mold and in the pattern or core forming step will be reduced in thickness. The effective thickness can be programmed as a constant. However, in accordance with another aspect of the invention, it is recognized that the liner thickness, or effective liner thickness, may vary during plastication for any number of reasons and the intermediate modified data base represented by schematic block 18 can be utilized, specifically the $Z_{calc}$ coordinate by routines programmed into computer 12 to account for molding variations for any specific grid element or pixel 23 vis-a-vis block 19 which can be programmed for such routines. For example, should a portion of the surface of object 10 change slope rapidly, it is conceivable that seepage of styrofoam or plastic in the molding press to produce a thicker lining area in certain portions of the mold than in other portions. Computer 10 can be programmed to determine a rate by comparing $Z_{calc}$ pixel positions to determine when a sufficiently steep slope has occurred to account for liner thickness variation. Alternatively, the $Z_{calc}$ data base could be used in controlling the deposition of the liner material onto rod ends of the mold to make certain mold positions thicker or thinner to account for the vaporization of the plastic. Still further, computer 12 can be programmed to calculate object geometry such as wall section thicknesses, again utilizing the $Z_{calc}$ coordinate of adjacent pixels to determine undercuts, etc. and adjust appropriate pixels 23 accordingly. With the intermediate data base depicted by schematic block 18 in FIG. 3, modified to account for all such molding variations depicted by schematic block 19, a final customized CAD/CAM data base (x',y',z') is developed and illustrated by reference numeral 20 in FIG. 3. Those skilled in the art will recognize that the drawing of object 10 could in fact be the mold drawing in which instance, the molding variation block 19 which produces the final data base block 20 would not be needed and the data base would simply be generated at intermediate CAD/CAM data base 18.

The programming instructions by which the conventional CAD/CAM data base 14 is modified in accordance with the steps set forth above is within the skill of the ordinary programmer in the art (for example, see Masters U.S. Pat. No. 5,134,569) and is thus not shown nor described in detail herein. For example, prior to generation of the final CAD/CAM modified data base shown in block 20, any number of known filtering techniques indicated by dash block 30 in FIG. 3 could also be utilized to insure accurate generation of coordinates f(x',y',z'). Further, it is recognized that those skilled in the art may develop specific algorithms to speed or increase the accuracy of the resulting modified CAD/CAM data base 20, which in and of themselves, could conceivably be inventions resulting from the disclosure of the invention herein. Nonetheless, conventional programming techniques known today can be employed to modify CAD/CAM data base 14 in the manner described above to produce an accurate data base for purposes of the invention.

Figure 3A:
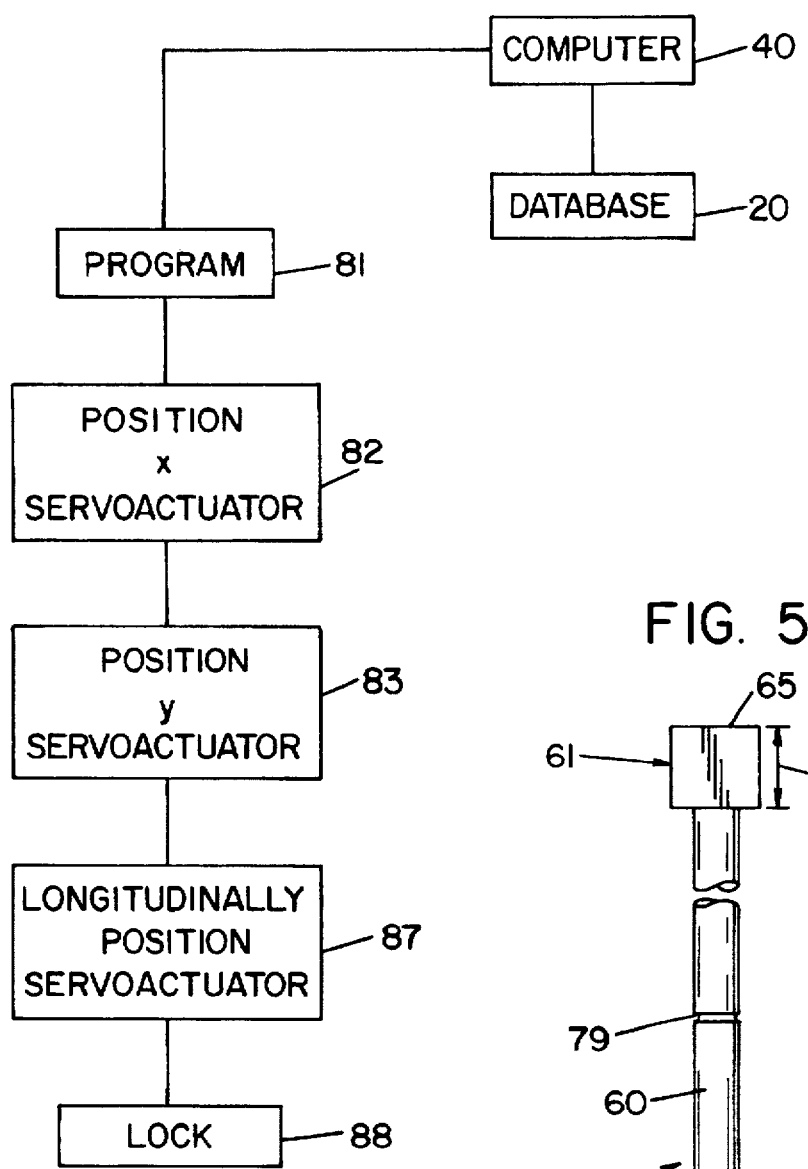
FIG. 3A is a general hardware/process flow chart of the system of the present invention related to the development of a pin mold.
Figure 4:
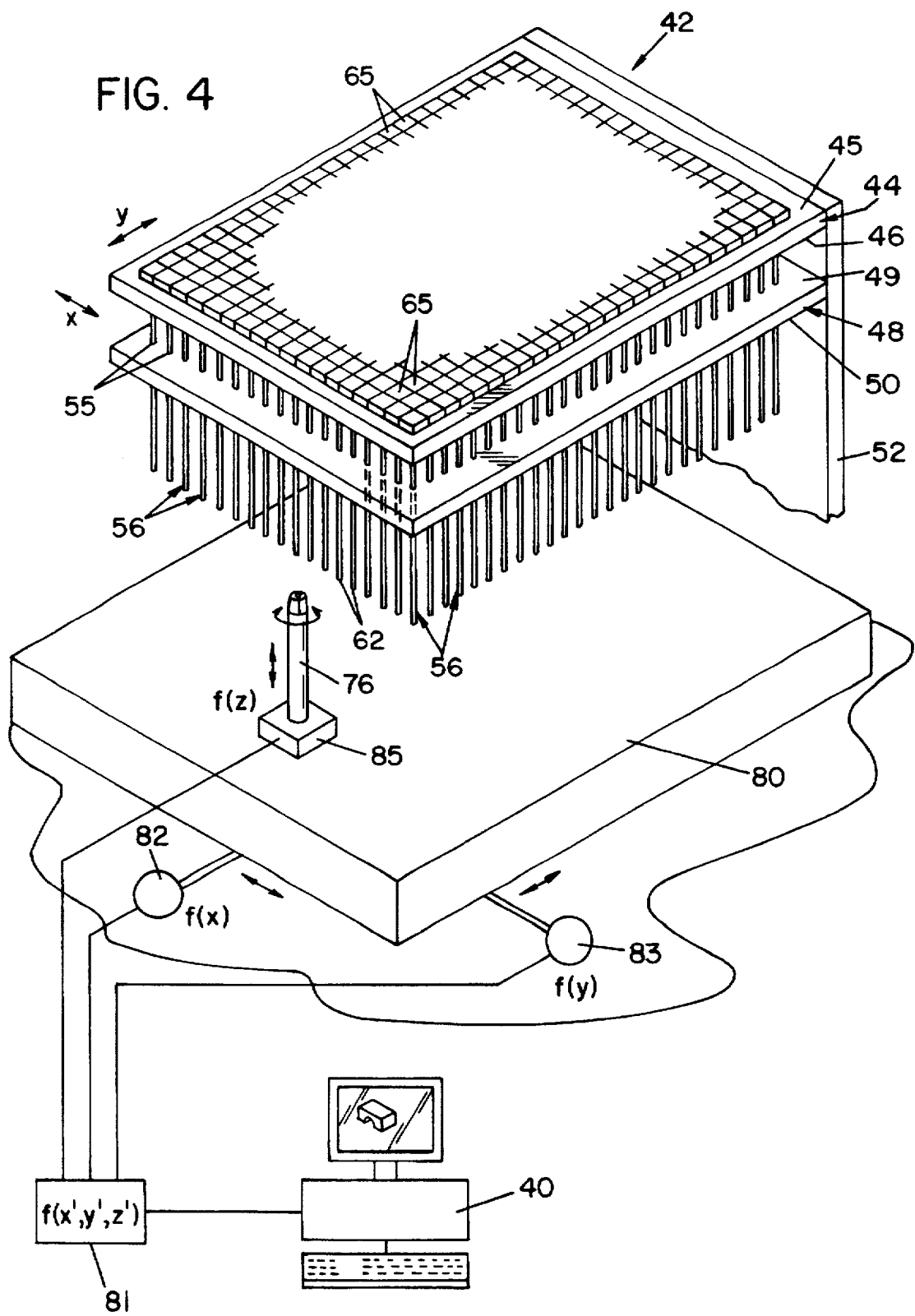
FIG. 4 is a pictorial representation of a portion of the system of the present invention illustrating the pin mold.

Referring now to FIGS. 3A and 4, the modified data base produced in schematic block 20 is transferred onto a disk and placed into memory or otherwise read into a personal computer 40.

Referring now to FIG. 4, there is shown in general form a pictorial representation of a pin mold 42 of the present invention. Pin mold 42, in the preferred embodiment, has a first guide plate 44 with upper 45 and lower 46 generally flat surfaces. Spaced from first plate 44 is a generally parallel second guide plate 48 having also upper 49 and lower 50 generally flat surfaces. In theory, one (1) plate is sufficient. However, it is desired to have at least two (2) plates or more for ease in manufacturing as will be explained shortly. Each plate 44, 48 extends in an x-y plane as shown in FIG. 4 and is precisely mounted at its outer edges to a frame 52, only one portion of which is shown for drawing clarity purposes. Frame 52, in turn, is configured in a conventional manner to permit it to be mounted onto the platens of a molding press as described later.

For ease in explaining the invention, only one (1) pin mold 42 is shown. Those skilled in the art will understand that at least a second mold extending in the x-y plane is also required and that for certain configurations or objects, two additional frames 52 extending, for example in the y-z direction and two additional frames 52 each carry pin molds 42 extending in the x-z direction may be required to form a box for molding intricately shaped convoluted objects 10. Still further, each pin mold frame 52 lying in any plane may be composed of sections which are interconnected after pin positioning depending on the size and configuration of object 10. Specifically, depending on object configuration pin insert sections laying in an inclined plane could be inserted in frame 52.

However, it is contemplated that for most objects, only top and bottom pin molds 42 are required. Still further, for the journal bearing object 10 of the preferred embodiment, only one pin mold 42 is required to replicate the cylindrical surface shown. The remaining cast areas are flat and will simply comprise plates inserted into the molding press.

First guide plate 44 has a plurality of first configured holes 54 extending through first plate 44 and second plate 48 has a like plurality of second holes 55 extending through second plate 48. Each first hole 54 overlies and is aligned with and in perfect registry with a corresponding second hole 55.

Each hole 54, 55 is positioned to be centered on a respective pixel 23 in the x-y plane 21 discussed above with respect to the drawing of object 10 in FIGS. 1 and 2A, 2B, and 2C. First and second holes 54, 55 are configured to be oval in shape. Preferably they are formed, after initial drilling, by a chemical etch to assure their size, shape and alignment after the plates are masked in their pixel grid arrangement. Alternatively, mold 42 could comprise three or more metal plates which are relatively soft in an initial state by simultaneously punching or broaching the holes to assure registry followed by heat treating the plates to a hardened condition.

Figure 5:
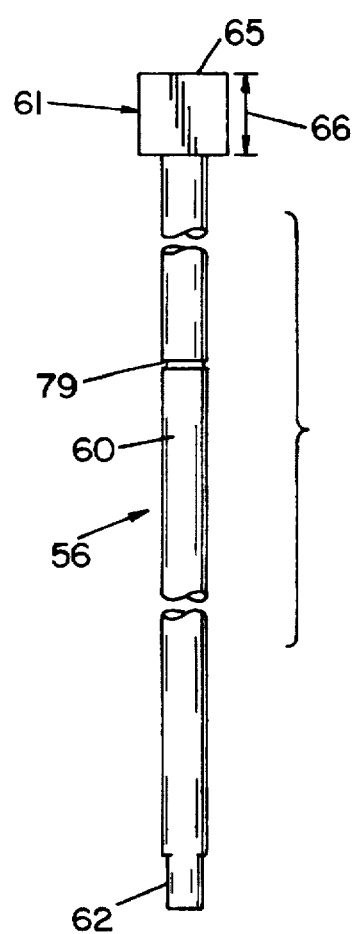
FIG. 5 is a longitudinal view of a rod used in the pin mold of the invention.

Extending through aligned first and, respectively, second holes 54, 55 in first and second guide plates 44, 48 is a rod member 56 as best shown in FIG. 5. Each rod member 56 has a longitudinally extending stem portion 60 terminating at one end in a configured head portion 61 and terminating at its opposite end in a bottom portion 62. Configured head portion has a flat end surface 65 which forms a portion of the mold. End surface 65 extends over an area equal to that of a grid element or pixel 23 and preferably is square in configuration. The depth of head portion 61, as indicated by reference numeral 66, longitudinally extends a distance at least equal to that of a square side distance of end surface 65. Bottom portion 62 of rod member 56 is shown as cylindrical in configuration but, alternatively, could be any shape designed to fit into the collet or chuck of a servo-actuator.

Figure 7:
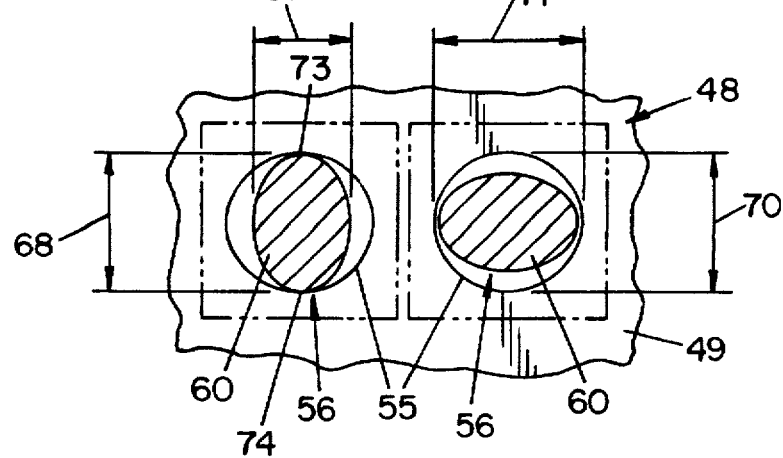
FIG. 7 is a cross sectional view showing the stem portion of the rods taken along lines 7—7 of FIG. 6.
Figure 8:
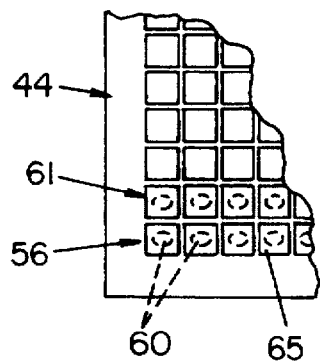
FIG. 8 is a partial plan view of a portion of the rods in an unlocked condition.
Figure 9:
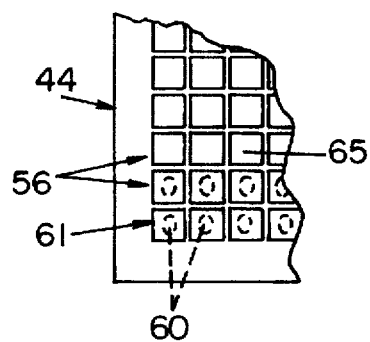
FIG. 9 is a plan view similar to FIG. 8 but with the rods in a locked position.

As best shown in FIG. 7, stem portion 60 of rod member 56 is oval or elliptical in configuration and its ellipse is conventionally defined by a rod minor diameter indicated by reference numeral 67 and a rod major diameter indicated by reference numeral 68 in FIG. 7. Similarly, each first and second hole 54, 55 is likewise oval or elliptical in configuration in turn defined by a hole minor diameter shown as reference numeral 70 and a hole major diameter 71. Rod minor diameter 67 is less than hole minor diameter 70 and rod major diameter 68 is less than hole major diameter 71. With rod 56 rotationally positioned so that its major and minor diameters 67, 68 are basically aligned with hole minor and major diameters 70, 71, stem portion 60 of rod 56 can move longitudinally through first and second holes 54, 55 relative to first and second plates 44, 48. However, rod major diameter 68 is greater than hole minor diameter 70 so that by rotating rod 56 within holes 54, 55 an interference fit between rod and holes can be caused to occur. As shown in FIG. 7, rotation of rod 56 relative to holes 54, 55 will cause at least two point line contacts designated by reference numerals 73, 74 to occur which, depending on the rotational force, will generate a frictional engagement between rod 56 and guide plates 44, 48 locking stem portion 60 of each rod member 56 at any desired position relative to top and bottom guide plates 44, 48.

Figure 6:
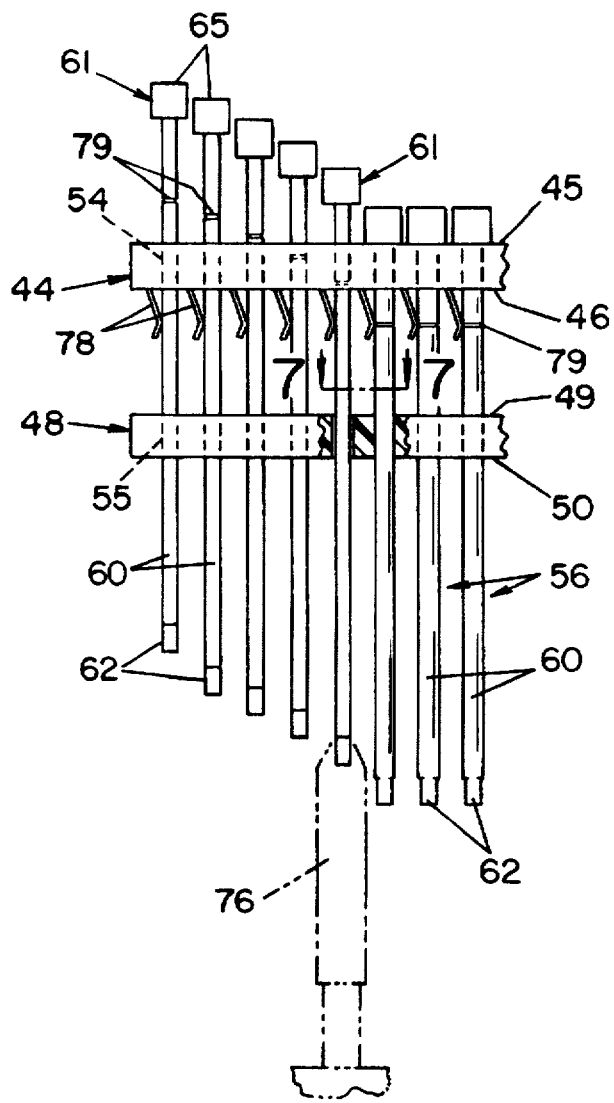
FIG. 6 is a longitudinal view of a portion of the mold illustrated in FIG. 4 showing several rods positioned within the mold and several rods in an at rest condition.

Referring now to FIG. 6 there is shown several rods longitudinally positioned at their desired height within holes 54, 55 by means of an automatic collet or automatic chuck shown as reference numeral 76 while several rods on the right hand side of FIG. 6 are still in their at rest, non-adjusted position. It will be appreciated that the diameter of stem portion 60 must be less than the side distance of square head portion 61 to provide clearance between adjacent rod members 44 to permit collet 76 to grab and move each rod member 44 individually. This defines somewhat the resolution capabilities of the present invention. As a point of reference, rod spacing cannot be less than 1/32". For the preferred embodiment rod spacing is set at 1/8". First and second plates 44, 48 are typically 12"×12" which produce at the 1/8" spacing 9,200 holes/rods for each pin mold 42.

Also illustrated in FIGS. 5 and 6 is an alternative embodiment of the invention which may optionally be used to assure the appropriate height of rods 56 when they are in their at rest position. In order to achieve this positioning, a groove or notch 79 is provided in stem portion 60 of rod member 56. Groove 79 then engages the tines of a spring clip 78 (FIG. 6) affixed to underside surface 46 of first guide plate 44, or alternatively, under side surface 50 of second guide plate 48. This spring clip 78 provides a sufficient bias restraining longitudinal movement of rod member 56 relative to first and second holes 54, 55 until collet 76 engages bottom portion 62 of rod member 56. Clip 78-groove 79 is simply presented as an alternative arrangement to prevent inadvertent longitudinal displacement of rod members 56 while being engaged by collet 76 of a servo-actuator.

Referring again to FIGS. 3A and 4, frame 52 of pin mold 42 is initially fixed relative to an index table 80. A program designated by schematic block 81 in FIG. 3A instructs computer 40 to read modified data base 20 and actuate the motor of an x-direction servo-actuator 82 and a y-direction servo-actuator 83 to sequentially position index table 80 under any specific rod member 56 indicative of any specified pixel 23. At this position, a z servo-actuator 85 is actuated so that its collet 76 firmly engages bottom end portion 62 of rod member 56. Once engaged, z servo-actuator 85 longitudinally displaces stem portion 60 of rod member 56 to its proper z distance. When this position is reached, z servo-actuator 85 rotates rod member 56 relative first and second holes 54, 55 to firmly lock rod member 56 within first and second holes 54, 55 as explained above with reference to FIG. 7.

This portion of program 81 is schematically illustrated by blocks 87, 88 in FIG. 3A. As explained above, the actual program by which this motion is accomplished is within the skill of the ordinary programmer in the art and is thus not set forth or defined in further detail herein. More specifically, a programmer skilled in the art is able to access modified data base 20 and program in a sequential indexing of table 80 to a pixel 23, actuate z actuator 85 to grab, longitudinally displace and lock rod members 56 in a sequential pattern so that end surfaces 65 of rod members 56 will automatically replicate the form of object 10. The process is entirely automatic under computer control. Furthermore, in the preferred embodiment and assuming 9,200 pins in a 12"×12" frame 52 and a time of 4 seconds to position and lock each pin in place, the total time to construct mold 42 would be about 10 hours. This is a significantly shortened time compared to what is now expended to machine a mold and it is done automatically and without the presence of an operator. All that is required is for an operator to physically push rods 56 into their at rest condition at which time the construction of pin mold 42 is now under complete control of computer 40.

FIG. 10C illustrates schematically the longitudinal position of some of rods 56 which make a portion of the mold. When the surface of the object is thus replicated by pin mold 42, a plastic liner 90 is positioned over end surfaces 65 of rod member 56 in pin mold 42 as illustrated in FIG. 10D. Polystyrene, polymethylmethacrylate and periodically expanded polymethylmethacrylate are conventional materials commonly used to produce the styrofoam core used in the Lost Foam Casting process. A typical approach is to lay a sheet of plastic liner 90 against end surfaces 65 of rod member 56 as described. Pin mold 42 with plastic liner 90 in place, is then fixed to a platen 92 of a conventional molding press 95 as diagrammatically illustrated in FIG. 10E. Molding press 95 also has an upper platen 96 to which a second pin mold 42 would also be affixed. However, in the preferred embodiment, the parting line was chosen as a flat end surface of the journal bearing block object 10 and thus a plastic liner 90 is simply laid against a flat block 97 secured to upper platen 96. Similarly, a plastic liner 90 is laid against flat edge surfaces 98, 99, it being understood that depending on the shape of the cast object, pin molds could be applied for all such surfaces. Plastic liners 90, covering pin mold 42 define a core cavity 100 which, in turn, will replicate object 10.

Figure 10E:
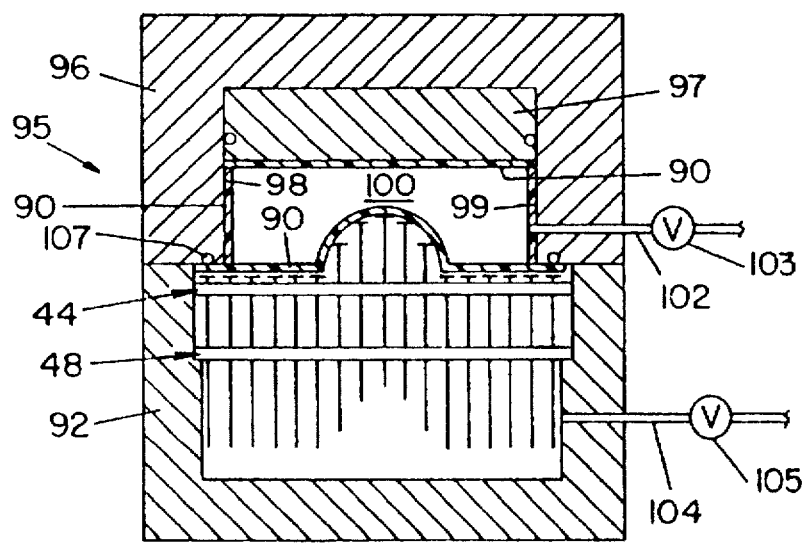
FIG. 10E is a schematic representation of the mold fitted to platens of a molding press to form a core pattern.
Figure 10F:
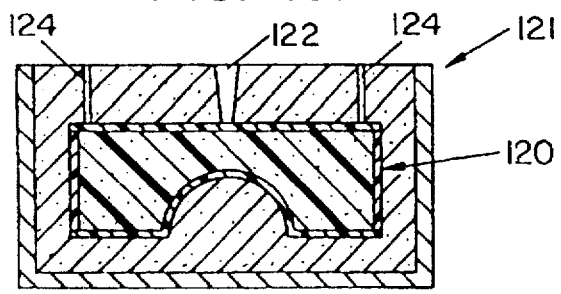
FIG. 10F is a schematic representation of the pattern formed in the mold press of FIG. 10E embedded in a sand mold for casting.
Figure 11:
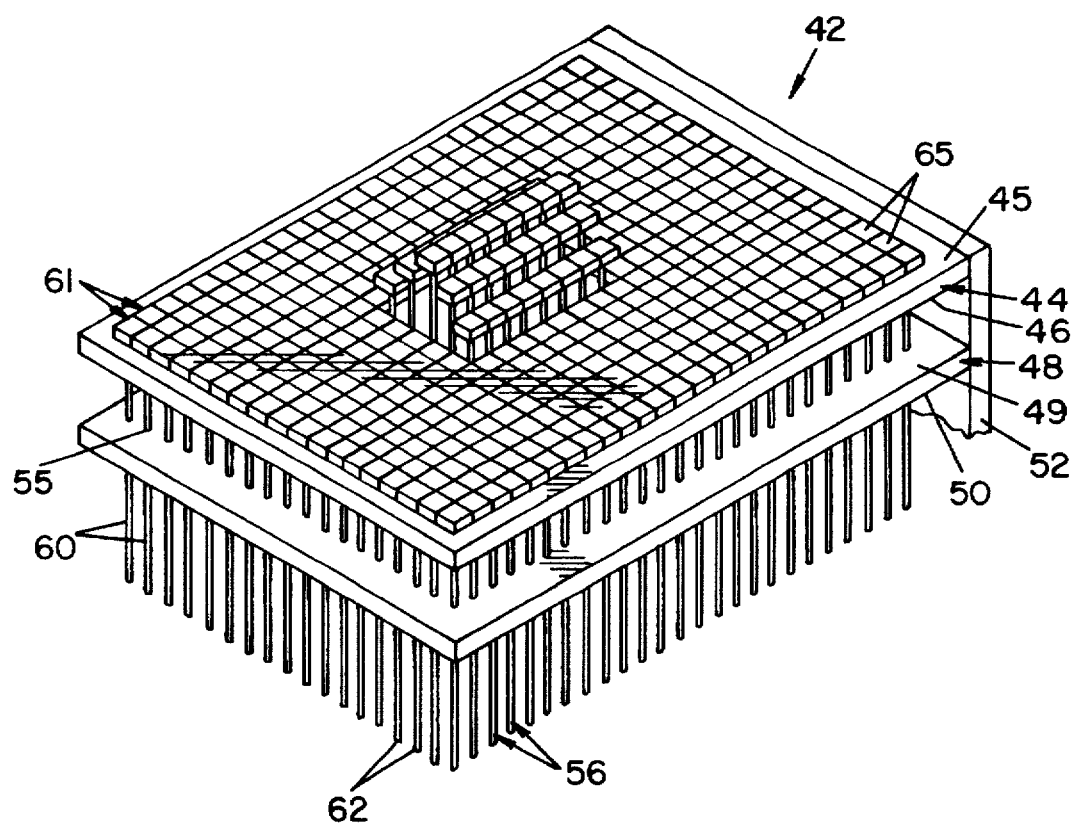
FIG. 11 is a pictorial representation of the rod formed mold of the present invention with the rods positioned to replicate the surface contour of the object illustrated in FIGS. 1 and 2.

Referring still to FIG. 10E, once mold liner 90 is positioned within pin mold 42 and mold frames 52 assembled within molding press 95, plastic liners 90 are heated, for example, by resistance heaters (not shown). To insure that the plastic smoothly flows into the contour of the mold, pressurized steam is typically introduced through a nozzle 102 into core cavity 100. The steam, under the control of valve 103 pressurizes core cavity 100 to pressures as high as 30 psig. Thus, a force as high as 4,300 lbs. can be exerted over the total area of end surfaces 65 of rod members 56 in a pin mold 42 having 12"×12" first and second guide plates 44, 48. Plastic liner is thus uniformly embedded (and its thickness altered as discussed above) into the contour of pin mold 42 as perhaps best shown in FIG. 11 and its interior surface closely approximates end surfaces 65 of rod members 56 in pin mold 42. Since rod members 56 are held in longitudinal position by frictional engagement within holes 54, 55, the plate thickness needed to develop sufficient frictional bearing engagement will be somewhere between 2.5" to 3" to maintain deflection below 0.010". Alternatively, the total thickness of first and second guide plates 44, 48 can be reduced by modifying mold press 95 to have a second steam nozzle 104 injecting steam at a lesser pressure through valve 105 which steam pressure will be exerted against the underside surfaces 46, 50 of first and second guide plates 44, 48 and the underside surface of top end portion 61 of rod members 56 without necessarily adversely impacting the steam pressure within core cavity 100. Molding press 95 would have to be modified to seal its platens as diagrammatically illustrated by reference numeral 107 to form an underside pressure chamber for second steam nozzle 104.

Apart from steam pressure tending to deflect rod member 56, it is to be appreciated that there must be some finite clearance between head portions 61 of adjacent rod members 56 to allow relative displacement between adjacent rod members. When the surface configuration of object 10 changes rapidly, i.e., a steep slope, end surfaces 65 of each rod member 56 will not totally mesh with or confront the contour of object 10. This is illustrated in a significantly distorted, exaggerated manner in FIG. 10D-1" with the result that in certain portions of a mold of a particular object, the expansion of plastic liner 90 might not develop an interior surface which exactly replicates the surface configuration of object 10. One arrangement, diagrammatically illustrated as an alternative embodiment in FIG. 10D-1, which is provided to compensate for this condition is to apply plastic liner 94 by means of an extruder nozzle 110. Extruder nozzle 110 varies the thickness of plastic liner 94 as it sprays the plastic material over each rod or pixel end surface 65. The positioning of extruder nozzle 110 can be controlled by the modified CAD/CAM data base 20 and its rate of plastic flow or its travel rate can be controlled in accordance with the z' co-ordinate change to deposit the plastic at various thicknesses about the mold. For example, when the computer determines that there is a rapid change in the z dimension within certain limits, the nozzle flow rate of the plastic forming liner 94 can be increased. Reference can be had to Masters U.S. Pat. No. 5,134,569 in this regard. A totally different conceptual approach would be to form a pin insert for that portion of the object and patch the pin insert into the grid array of pin mold 42.

In either instance, once the core pattern 120 has been formed in molding press 95, it is removed and conventionally sprayed with a refractory. The core pattern is then packed into a conventional sand mold 121 provided with a sprue 122 and risers 124. Object 10 is formed or cast in a conventional Lost Foam Casting manner.

Figure 12:
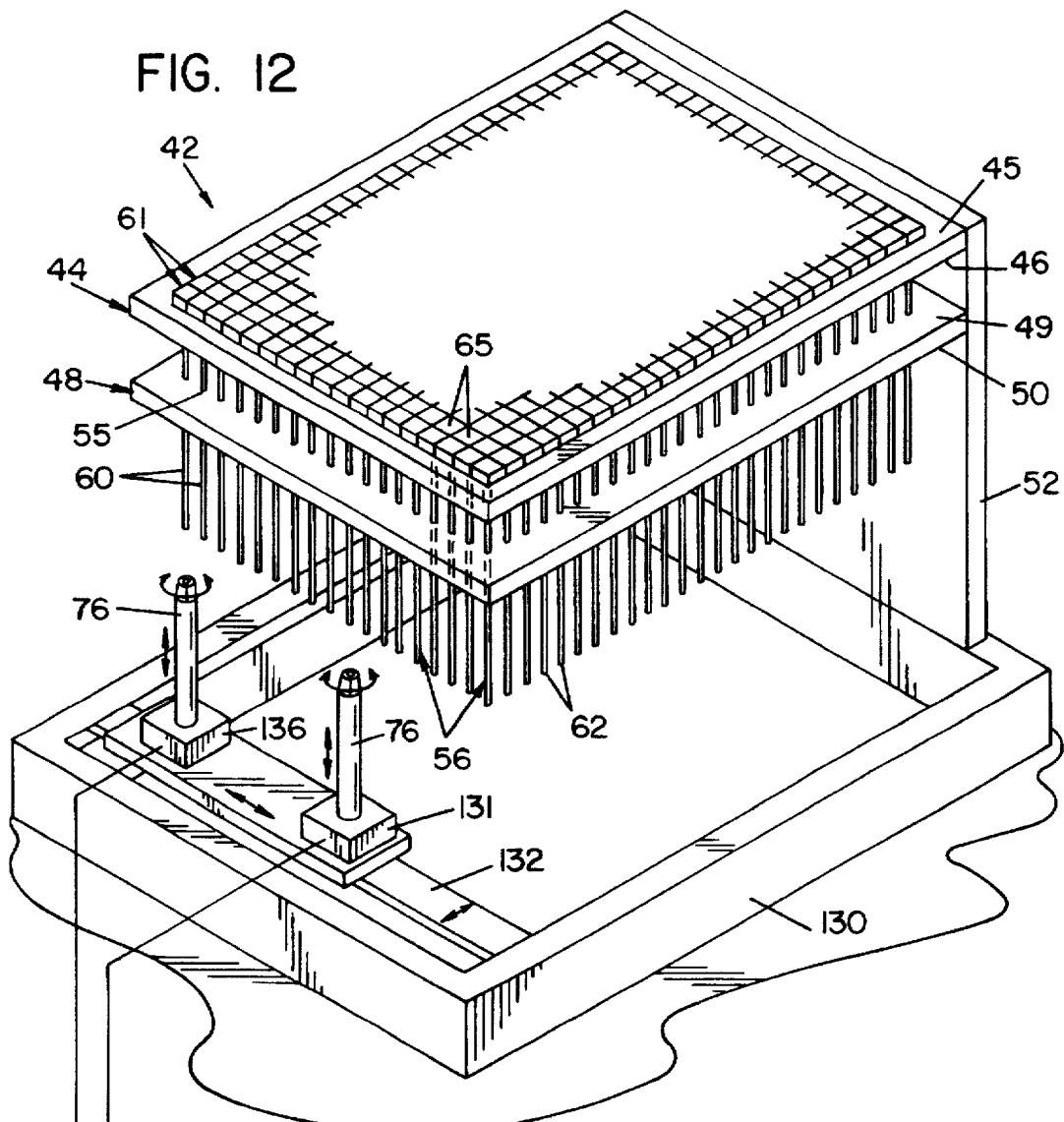
FIG. 12 is a view similar to FIG. 4 but showing an alternative arrangement for adjusting the rods of the mold.

Referring now to FIG. 12 there is shown a slight modification to the inventive system used to adjust the longitudinal position of rod members 56 and the same reference numerals used in explaining the operation of the preferred embodiment will likewise apply to the alternative system illustrated in FIG. 12 where applicable. Basically, index table 80 of the preferred embodiment illustrated in FIG. 4 is replaced with a stationary table 130 and one servo-actuator 131. The y position is controlled vis-a-vis a movable cross bar 132 on stationary table 130 while servo-actuator 131 is driven to the appropriate "x" position along cross bar 132. After servo-actuator 131 grasps a rod member 56 with its expandable collet 76, rod member 56 is driven to and locked at the desired z distance. Also, a second servo-actuator 136 may likewise be employed on cross bar 132 to reduce the overall processing time to form end mold 42. First and second actuators 131, 136 are under the control of computer 40 and follow the process flow arrangement illustrated in FIG. 3A.

The invention has been explained with reference to preferred and alternative embodiments and as noted above, has been specifically designed for use in the Lost Foam Casting process where it has particular application for closely controlled tolerances of cast objects. Those skilled in the art will realize that the invention has broader application and can be applied to any number of casting processes. It is intended to include all such modifications and alterations in-so-far as they come within the scope of the present invention.

Having thus defined the invention it is claimed:

1. A process for molding an object comprising the steps of:
  a) drawing said object using a computer machine employing conventional CAD/CAM software to develop a data base file of the surface contour of said object;
  b) establishing a parting line plane on said drawing containing the parting line of said object when cast in said mold;
  c) modifying said data base file by dividing said surface contour into pixels of discrete area and assigning to each pixel an x-y co-ordinate defining the position of each pixel in an x-y plane and determining by computer calculation the distance of each pixel from said parting line plane and assigning said distance to said pixel x-y co-ordinate;
  d) providing a mold frame having a plate extending in an x-y plane, said plate having a plurality of openings extending therethrough and within each opening a rod longitudinally movable relative to said holes, each rod having an end surface of area corresponding to said pixel; and
  e) utilizing said modified data base by a computerized machine to index said frame to a computer controlled x-y position corresponding to any computer selected pixel and longitudinally moving said rod at said selected position a distance corresponding to the distance of said selected pixel from said parting line whereby said end surfaces of said rods replicate the surface of said object without machining a mold.

2. The process of claim 1 further including in step c) modifying the computed distance from each pixel to said parting line plane by a distance correlated to a melted thickness of a plastic liner placed against said rod end to form a core for subsequently casting a metal part.

3. The process of claim 2 wherein said distance which defines the position of any selected pixel relative to said parting line plane is expressed as a z co-ordinate, and said frame having first and second generally parallel plates, each plate having a plurality of holes with any given hole in one plate aligned and in registry with a corresponding hole in the other plate, each rod extending through a pair of aligned holes in said plates, and the cross-sectional configuration of said rods relative to said holes being elliptical;

controlling a servo-actuator by a computer reading said modified data file;

grasping each rod at one end thereof by said servo-actuator and longitudinally moving each rod a distance through said holes corresponding to the calculated z distance for any specific rod and thereafter rotating each rod relative to said holes into frictional engagement with one another.

4. The process of claim 3 wherein said servo-actuator is stationary and said frame containing said rods moves under computer control in an x-y direction to permit said rods to be longitudinally positioned in a locked condition by said servo-actuator.

5. The process of claim 4 wherein a plurality of servo-actuators are provided for positioning said rods.

6. An automatic process for manufacturing a three dimensional core pattern of an object for use in a lost foam casting process, said object designed and drawn on a computer machine, said process comprising the steps of:
  a) providing from said drawing of said object developed by said computer machine a design data file of surface co-ordinates defined as x-y co-ordinates in a series of two-dimensional orthogonal planes extending in an x-y direction, each x-y co-ordinate indicative of a discrete pixel extending over a discrete surface area of said object in an x-y plane;
  b) establishing a parting line lying in a parting line plane for said object correlated to a third dimension, z, orthogonal to said x-y planes and generating by a computer calculation for each x-y pixel co-ordinate a z co-ordinate corresponding to the distance in the z direction for each x-y pixel co-ordinate to said parting line plane;
  c) modifying said z distance for each selected x-y pixel in a given x-y plane correlated to a anticipated thickness of a mold liner and generating a modified data file in which each x-y pixel has a generated z distance associated therewith;
  d) automatically forming by use of said modified data file a mold surface replicating a surface of said object by using said x-y pixels, each x-y pixel modified by said z distance to produce said mold surface; and
  e) providing a plastic mold liner and covering said mold surface with said plastic mold liner to produce a core pattern for subsequent use in said lost foam casting process.

7. The process of claim 6 further comprising the steps of:
  f) providing within a frame a plurality of longitudinally-extending and movable rods having configured head end surfaces adjacent one another, each head end surface having an area about that of said pixel, said rods arranged in an array of rows extending along an x axis with rods in each row extending along a y axis orthogonal to said x axis, each rod having an x-y coordinate corresponding to said x-y coordinate of a pixel associated therewith, and g) longitudinally moving and locking each rod relative to one another by a servo-actuator at a distance correlated to said modified z distance computed for said x-y pixel corresponding to each rod.

8. The process of claim 7 further comprising the steps of:

h) providing a plurality of servo-actuators; and i) initially indexing said rods relative to a first actuator at the center rows of said rod array for moving said pins in said center row said longitudinal distance and subsequently using said plurality of servo-actuators to adjust longitudinally the remaining pins in said array.

9. The process of claim 7 further including the steps of:

j) providing said frame with first and second generally parallel plates, each plate having a plurality of holes with any given hole in one plate aligned and in registry with a corresponding hole in the other plate, each rod extending through a pair of aligned holes in said plates, and the cross-sectional configuration of said rods relative to said holes being elliptical;

k) controlling said servo-actuator by a computer reading said modified data file;

l) grasping each rod at one end thereof by said servo-actuator and longitudinally moving each rod a distance through said holes corresponding to the calculated z distance for any specific rod and thereafter rotating each rod relative to said holes into frictional engagement with one another.

10. The process of claim 9 wherein said servo-actuator is stationary and said frame containing said rods moves under computer control in an x-y direction to permit said rods to be longitudinally positioned in a locked condition by said servo-actuator.

11. The process of claim 10 wherein a plurality of servo-actuators are provided for positioning said rods.

12. The process of claim 9 further including a plurality of frames, each frame having a plurality of said longitudinally movable rods within said plates and orthogonally positioned relative to an adjacent frame to form a box like enclosure, the interior of which forms a core pattern defined by said rod end surfaces replicating the surface configuration of said object.

13. A lost foam casting system including a mold for forming a styrofoam core in a molding press, comprising:

a) a conventional CAD/CAM data file of said object drawn on a computerized machine;

b) means to modify said data file by i) dividing the surface of said object into pixels of predetermined size, each pixel lying in an orthogonal two dimensional x-y plane, ii) assigning to each pixel a computed distance extending in a z dimension orthogonally from said x-y plane to a parting line plane in which the parting line of said core resides and iii) modifying said z distance for each pixel to account for characteristics of a mold liner;

c) a mold frame having a plurality of rods situated side by side in an x-y plane corresponding to the plane of said pixels, each rod having an end surface corresponding to the area of said pixel and movable in a longitudinal direction; and d) servo-actuator, computer control means using said modified data file to longitudinally position each rod so that each rod's end surface corresponds to a surface position of said object spaced from said parting line a computed distance to account for molding variations caused by said mold liner.

14. The system of claim 13 wherein said mold frame has at least first and second spaced plates extending in an x-y plane and generally parallel one another, said first plate having a plurality of first openings and said second plate having a like plurality of second openings, each first opening aligned and in registry with a corresponding opening in said second plate, each rod extending through one of said first openings and an aligned second opening, each rod having a top flat end surface, a bottom configured end and a stem portion therebetween, said stem portion generally elliptical in configuration;

said servo-actuator means effective to longitudinally move said stem portion of each rod relative to said first and second plates to cause said top end surface of each rod to be positioned at its corresponding modified z distance and to lock said rod at said position within said first and second openings by rotating said rod within said first and second openings.

15. The system of claim 14 wherein said first and second openings are generally elliptical in configuration.

16. The system of claim 15 wherein said servo-actuator means includes computer controlled table means and computer controlled drive means; said table means holding said frame and indexing said frame in an x-y direction to position a selected pin for engagement with said drive means and said drive means effective to longitudinally move and lock said selected pin by rotation within said frame.

17. The system of claim 13 wherein said molding press includes a stationary and movable platen, means for mounting a frame to at least one of said platens, means for closing said platens to form a cavity having the contour of said object, a plastic coating disposed over and covering said rod top surfaces, means to introduce steam at controlled pressure and temperature on both sides of said coating for fusion of said coating without affecting the position of said rods relative to said plates.

18. The process of claim 17 further including a plurality of frames, each frame having a plurality of said longitudinally movable rods within said plates and orthogonally positioned relative to an adjacent frame to form a box like enclosure, the interior of which forms a core pattern defined by said rod end surfaces replicating the surface configuration of said object.

19. A universal mold comprising:

a frame having a plate extending in an x-y plane;

said plate having a plurality of first configured openings extending therethrough, each opening generally elliptical in configuration with a minor and a major diameter;

a plurality of rods, each rod having a longitudinally extending stem portion, a top end portion having a top end surface for forming a portion of the mold surface and a bottom end portion for rod gripping and positioning; each rod's stem portion extending through one of said plate's openings and having an oval configuration with a minor diameter smaller than said opening's minor diameter and a major diameter smaller than said opening's major diameter but longer than said opening's minor diameter; and servo-actuated, computer controlled driving means for engaging said bottom end portion of each rod and longitudinally moving each shaft relative to its receiving opening a predetermined distance and thereafter rotating said shaft portion relative to its receiving opening to frictionally lock each rod within said plate.

20. The mold of claim 19 further including a plurality of plates overlying one another, each plate having a like plurality of configured elliptical openings, said openings in any given plate aligned and in registry with the openings in said other plate, said shaft portion of each rod extending through the aligned openings in said plates whereby the frictional locking force of each rod is increased.

21. The mold of claim 20 further including means for indexing said frame in said x-y plane to selectively position each rod member for engagement by said servo-actuated means.

22. The mold of claim 21 further including a plurality of frames, each frame having a plurality of plates with configured aligned openings and configured rods extending through aligned openings, and each frame affixed to one another to form a mold cavity therebetween.

* * * * *